United States Patent
Surazski et al.

(10) Patent No.: US 7,593,355 B1
(45) Date of Patent: Sep. 22, 2009

(54) METHOD AND APPARATUS FOR AN ENHANCED VOIP CALL INITIATION INTERFACE

(75) Inventors: Luke Surazski, Santa Clara, CA (US); Pascal Huart, Dallas, TX (US)

(73) Assignee: Cisco Technology, Inc., San Jose, CA (US)

(*) Notice: Subject to any disclaimer, the term of this patent is extended or adjusted under 35 U.S.C. 154(b) by 703 days.

(21) Appl. No.: 09/758,911

(22) Filed: Jan. 10, 2001

(51) Int. Cl.
H04L 12/16 (2006.01)
H04Q 11/00 (2006.01)
H04L 12/28 (2006.01)
H04L 12/56 (2006.01)

(52) U.S. Cl. .............. 370/261; 370/260; 370/352; 370/401; 455/416; 709/229; 379/201.06

(58) Field of Classification Search .......... 370/352, 370/353, 354, 355, 356, 395.2, 395.31
See application file for complete search history.

(56) References Cited

U.S. PATENT DOCUMENTS

| | | | | |
|---|---|---|---|---|
| 5,712,906 A * | 1/1998 | Grady et al. | ........... | 379/93.25 |
| 6,031,836 A * | 2/2000 | Haserodt | ........... | 370/389 |
| 6,064,887 A * | 5/2000 | Kallioniemi et al. | ........... | 455/445 |
| 6,134,316 A * | 10/2000 | Kallioniemi et al. | ........... | 379/220.01 |
| 6,438,599 B1* | 8/2002 | Chack | ........... | 709/229 |
| 6,480,484 B2* | 11/2002 | Morton | ........... | 370/352 |
| 6,493,325 B1* | 12/2002 | Hjalmtysson et al. | ........... | 370/261 |
| 6,516,203 B1* | 2/2003 | Enzmann et al. | ........... | 455/556.13 |
| 6,658,100 B1* | 12/2003 | Lund | ........... | 379/201.01 |
| 6,661,886 B1 | 12/2003 | Huart et al. | ........... | 379/215.01 |
| 6,678,718 B1* | 1/2004 | Khouri et al. | ........... | 709/204 |
| 6,687,242 B1* | 2/2004 | Enzmann et al. | ........... | 370/352 |
| 6,690,654 B2* | 2/2004 | Elliott et al. | ........... | 370/260 |
| 6,690,663 B1* | 2/2004 | Culver | ........... | 370/352 |
| 6,717,593 B1* | 4/2004 | Jennings | ........... | 345/760 |
| 6,754,342 B1 | 6/2004 | Surazski et al. | ........... | 379/421 |
| 6,775,697 B1 | 8/2004 | Surazski et al. | ........... | 709/220 |
| 6,799,049 B1* | 9/2004 | Zellner et al. | ........... | 455/456.1 |
| 6,834,048 B1* | 12/2004 | Cho et al. | ........... | 370/356 |
| 6,865,681 B2* | 3/2005 | Nuutinen | ........... | 726/14 |
| 6,868,140 B2* | 3/2005 | Myers et al. | ........... | 379/67.1 |
| 6,873,604 B1 | 3/2005 | Surazski et al. | ........... | 370/271 |
| 7,023,971 B1 | 4/2006 | Huart et al. | ........... | 379/88.18 |
| 7,373,413 B1 | 5/2008 | Nguyen et al. | ........... | 709/231 |
| 2001/0038624 A1* | 11/2001 | Greenberg et al. | ........... | 370/352 |
| 2002/0136167 A1* | 9/2002 | Steele et al. | ........... | 370/260 |
| 2003/0128691 A1* | 7/2003 | Bergman et al. | ........... | 370/352 |
| 2004/0145604 A1* | 7/2004 | Min | ........... | 345/733 |

* cited by examiner

Primary Examiner—Edan Orgad
Assistant Examiner—Blanche Wong
(74) Attorney, Agent, or Firm—Brinks Hofer Gilson & Lione

(57) ABSTRACT

A method and apparatus is disclosed for providing an improved interface to a caller during the initiation of a VoIP call. The present invention includes placing, by the caller, a request for information regarding a party to be called; returning a URL responsive to the request; and displaying to the caller one or more connection options corresponding to the URL. Additional aspects of the present invention include choosing, by the caller, at least one of the one or more connection options, and placing a call responsive to the one or more connection options chosen by the caller.

14 Claims, 10 Drawing Sheets

Present Invention

Present Invention

Present Invention

Present Invention

Present Invention

Present Invention

Present Invention

Present Invention

Present Invention

METHOD AND APPARATUS FOR AN ENHANCED VOIP CALL INITIATION INTERFACE

BACKGROUND OF THE INVENTION

1. Field of the Invention

The present invention relates to IP telephony. In particular, the present invention relates to a method and apparatus which provides an enhanced interface during the initiation of a VoIP call.

2. The Prior Art

Background

The widespread acceptance and use of the Internet has generated much excitement, particularly among those who see the Internet as a possible substitute for the traditional telephone system. As the backbone of the Internet continues to be upgraded and expanded, the promise of a low-cost substitute to the traditional PBX system may now be realized.

One type of Internet-based telephony system that is gaining acceptance is IP telephony, which transfers voice information over the Internet Protocol (IP) of the TCP/IP protocol suite. While many standards exist, such as Voice over Packet (VOP) for Frame Relay and ATM networks, as used herein the term "IP telephony" will be used to designate voice over any packet-based network. In IP telephony, a user wishing to communicate uses an IP telephone, which is a device which transports voice over a network using data packets instead of the traditional switched circuits of a voice only network.

FIG. 1 shows an IP telephony system 100 of the prior art. System 100 includes a business system 102 configured to provide IP telephony in an enterprise environment. Business system 102 may include a network 104, such as a corporate Ethernet LAN, to which a plurality of IP telephones 106 may be operatively coupled to network 104 using hardware and software standard in the art. To couple the business system 102 to the outside world, typically a gateway 108 standard in the art is provided and operatively coupled between network 104 and backbone network 110.

Backbone network 110 may be any packet-based network standard in the art, such as IP, Frame Relay, or ATM. To provide voice communications to legacy POTS phones, typically a gateway 112 is provided, which may be a VoIP gateway. Gateway 112 provides access to the Public Switched Telephone Network (PSTN) 114. Through PSTN 114, voice-only communications may be provided to legacy POTS phones 116.

The system 100 of FIG. 1 also includes an example of a broadband residential system 118. To reach individual residences, typically local ISP providers provide a cable or DSL head end 120 standard in the art. An individual wishing to utilize the ISP's service may then employ a cable modem or DSL modem 122 coupled to the user's home LAN 124. The user's home LAN may be provided by a home PC 126 configured to run software standard in the art such Microsoft Windows®. The user may then operatively couple an IP telephone 128 to the LAN 124.

Thus, in the system 100 of FIG. 1, IP telephones 106 in business system 102 may communicate by voice with other similar business systems similarly configured with IP telephones. For a business enterprise, communication by IP telephony may be advantageous because the need for a traditional PBX system can be eliminated. Furthermore, an IP telephony system is scalable and may be upgraded along with the enterprise's network system.

Likewise, the residence of system 118 may communicate by voice to a POTS phone 116 using IP telephone 128. From the view of the home user, the communication of FIG. 1 is advantageous because the communication operates over the backbone network 110 without accessing traditional long-distance service providers.

However, the method of FIG. 2 has certain disadvantages. The interface presented to users of prior art voicemail and/or telephony systems is a constant source of frustration. One common complaint is that the process of trying to locate a party can often be a long and frustrating experience. For example, if User A attempts to call User B and User B is not at their desk, initially User A must let the phone ring for some period of time before the call is picked up by voicemail or transferred elsewhere. Then, User A may be required to navigate through a maze within the interface a voicemail menu and presented with still further options. Ultimately, User A must leave a message, or try to reach User B at an alternate number by hanging up and dialing again, all the while wondering if their efforts at locating User B are in vain.

Hence there is a need for a method and apparatus which presents an enhanced VoIP interface which allows the caller to make more intelligent decisions during the call initiation process.

BRIEF DESCRIPTION OF THE INVENTION

The invention satisfies the above needs. The present invention relates to telephony. In particular, the present invention relates to a method and apparatus which provides an enhanced interface during the initiation of a VoIP call. A method is disclosed for providing an improved interface to a caller during the initiation of a VoIP call.

One aspect of a method according to the present invention includes the acts of placing, by the caller, a request for information regarding a party to be called; returning a URL responsive to the request; and displaying to the caller one or more connection options corresponding to the URL. Additional aspects of the present invention include choosing, by the caller, at least one of the one or more connection options, and placing a call responsive to the one or more connection options chosen by the caller.

A device for providing an improved interface to a caller during the initiation of a VoIP call is disclosed. In one aspect of the present invention, the device comprises means for placing, by the caller, a request for information regarding a party to be called; means for returning a URL responsive to the request; and means for displaying to the caller one or more connection options corresponding to said URL.

Additional aspects of the present invention include means for choosing, by the caller, at least one of said one or more connection options, and means for placing a call responsive to the one or more connection options chosen by the caller.

BRIEF DESCRIPTION OF THE DRAWING FIGURES

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

It is contemplated that the present invention may be embodied in various computer and machine readable data structures. Furthermore, it is contemplated that data structures embodying the present invention will be transmitted across computer and machine-readable media, and through communications systems by use of standard protocols such as those used to enable the Internet and other computer networking standards.

The invention further relates to machine-readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

Figure 2:
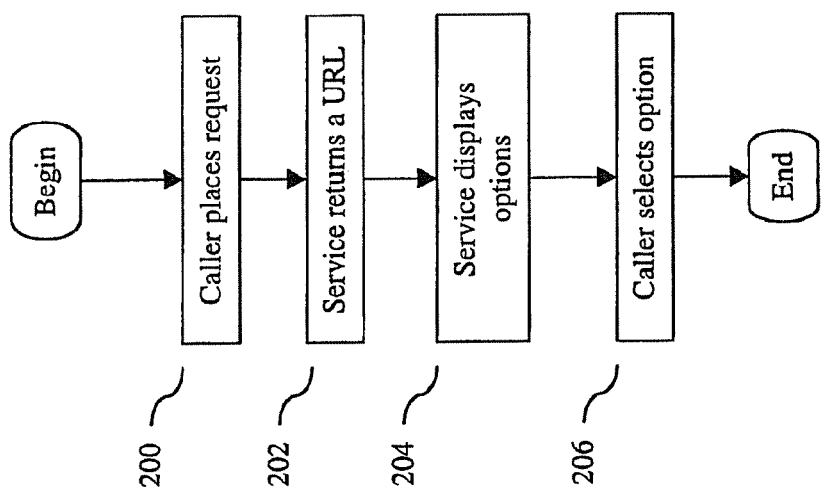
FIG. 2 is a flowchart of a method for providing an improved interface during the initiation of a VoIP call.

Referring now to FIG. 2, a flowchart providing a broad overview of a method according to the present invention is shown. The method begins with act 200, where a caller wishing to contact another party initially places a request using a VoIP device operating over a VoIP service. In act 202, the VoIP service returns a URL. In act 204, the service displays a list of connection options to the caller. In act 206, the caller selects one of the connection options, and the appropriate connection is then made.

Figure 3A:
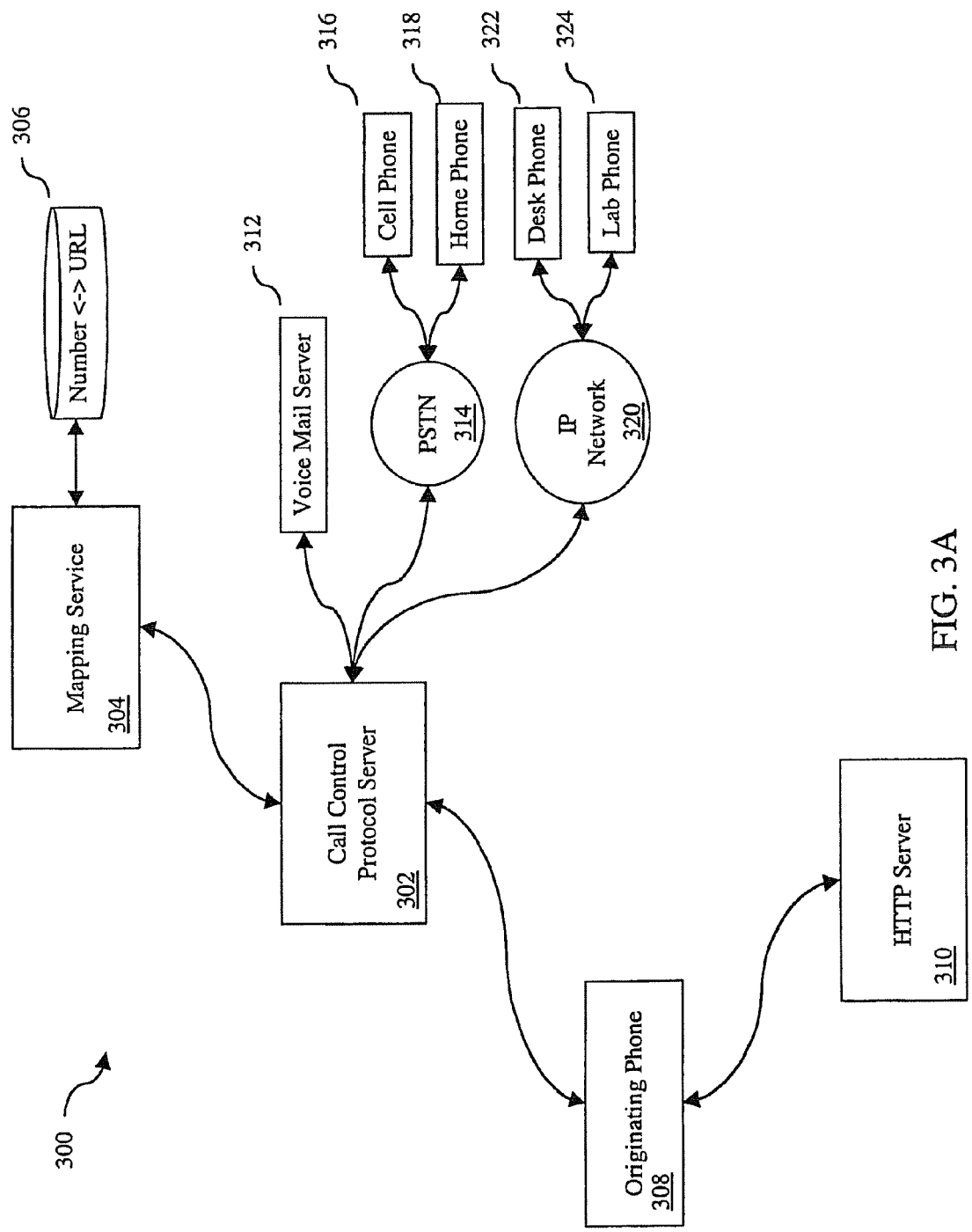
FIG. 3A is a functional block diagram of a VoIP system suitable for use with the present invention.

FIG. 3A is a functional block diagram of a VoIP system 300 suitable for use with the present invention. System 300 includes a call control protocol server 302. Protocol server 302 may comprise a wide variety of call control protocol servers known in the art, such as a SIP Proxy or a Cisco Call Manager. The protocol server provides, among other functions, a "number mapping service" which translates a phone number like "555-1234" to an "IP Address:Protocol". The protocol server may also provide assistance in placing the call by sending the appropriate control messages standard in the art to the next protocol server or the final destination The protocol server may also be embodied as a single server (such as a Call Manager for a small IP telephone network) or a collection of servers (such as a collection of SIP Proxies or a collection of Call Managers in the case of larger IP telephone networks). The server may also be embodied as a software component of an endpoint, such as in an H.323 endpoint.

Figure 1:
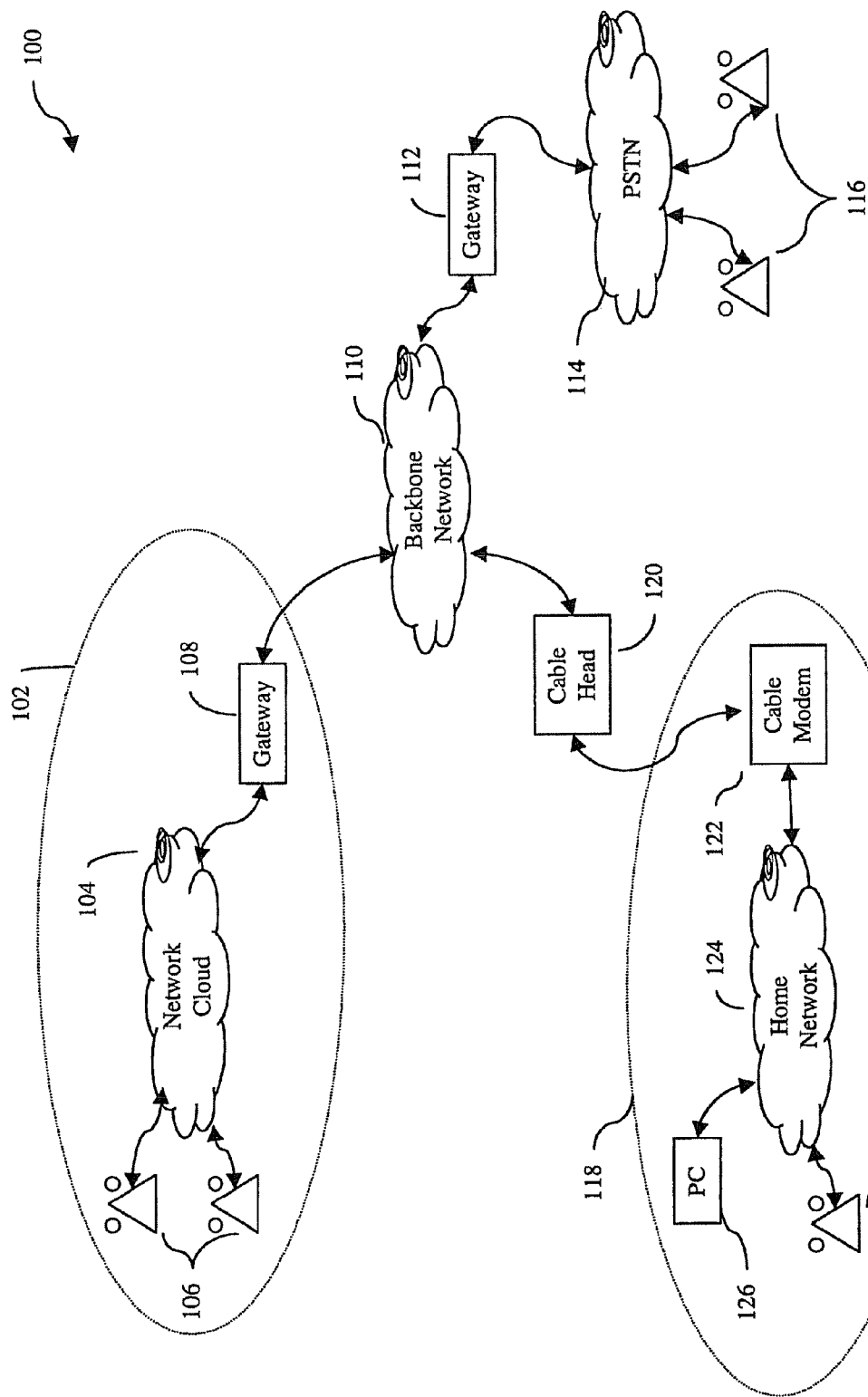
FIG. 1 is a prior art diagram of an IP telephone communications system.

The protocol server may be operatively coupled to a plurality of connection targets through which a target caller may be contacted. It is contemplated that a wide variety of connection targets may operatively coupled to protocol server 302 and utilized in the present invention. By way of a non-limiting example, system 300 may include a voice mail server 312 comprising hardware and software well known in the art. Additionally, connection targets within the meaning of the present invention may include any communication means such as those described in FIG. 1. For example, a cellular phone 316 or a traditional home phone 318 may be operatively coupled to protocol server 302 through the PSTN 314. Finally, one or more IP phones such as desk phone 322 or lab phone 324 may be operatively coupled to protocol server 302 through an IP network 320.

System 300 further includes a mapping service 304. Protocol server 302 is operatively coupled to mapping service 304 through means known in the art. The mapping service may be located on another server, or collection of servers, anywhere in the network. A protocol similar in nature to DNS may be defined for communication between the protocol server and the mapping service for use in the present invention. The protocol server may configured with the address or name of the mapping service.

In operation, for example during call setup, the protocol server may query the mapping service through the above-defined DNS-like protocol for a URL associated with a telephony target. As mentioned above, telephony targets within the scope of the present invention may include a wide variety of targets, such as a phone number, a SIP URL, a name, or an IP address.

Mapping service 304 includes hardware and software standard in the art for mapping user identifiers, such as phone numbers, to URLs. Mapping service 304 may be configured to comply with industry standards for mapping services such as those being promulgated by the Internet Engineering Task Force. Mapping service 304 may further include a database 306 operatively coupled thereto in which user identifiers and URLs are stored and indexed. Database 306 may comprise hardware and software standard in the art. Mapping service 304 as shown and described provides an example of means for mapping user identifiers to URLs.

Figure 3B:
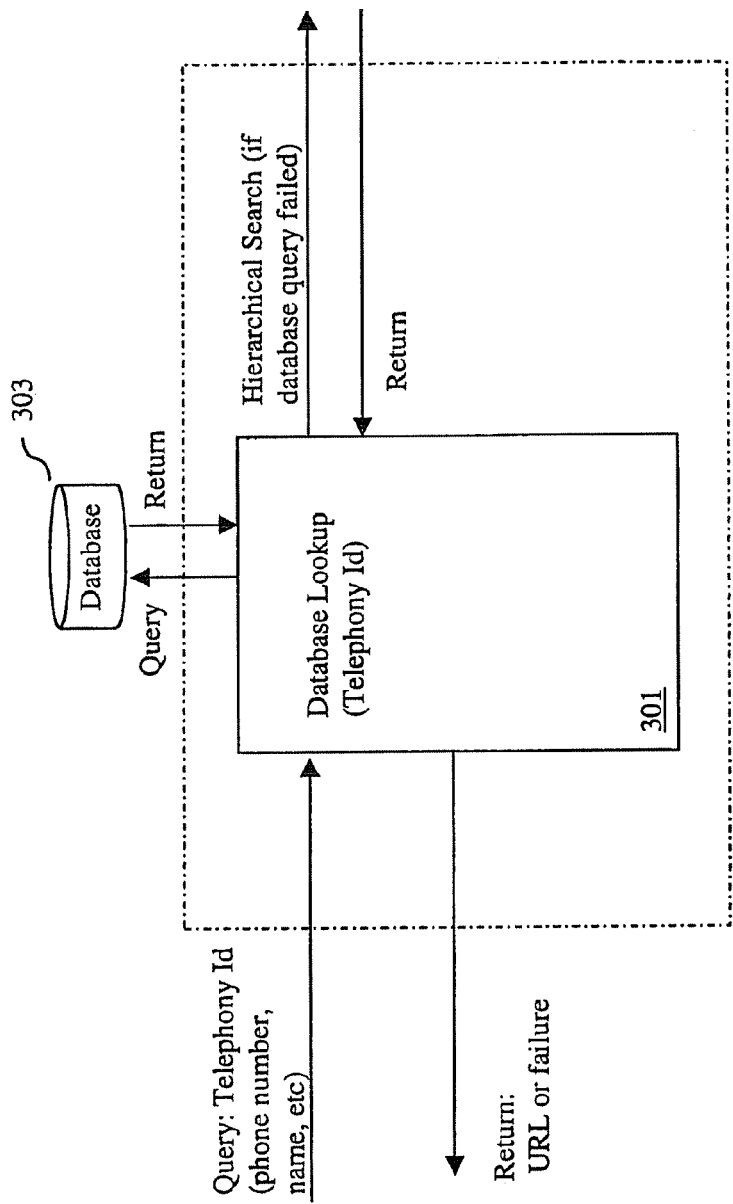
FIG. 3B is a functional block diagram of a mapping service suitable for use with the present invention.

Referring briefly to FIG. 3B, a block diagram is shown of one possible embodiment of a IETF-compliant mapping service 301 suitable for use with the present invention. As is appreciated by those having ordinary skill in the art, the block diagram of FIG. 3B is similar to a DNS server.

In operation, initially there is a hierarchical search. Each "Mapping Server" may contain a database 303 of number/name to URL mappings for a "domain" for which it is responsible. Domains, if based on phone numbers, may consist of an area code or a region code. By way of a non-limiting example, in San Jose, Calif., Cisco Systems, Inc. may be responsible for the domains (408-525). (408-526), (408-527), and (408-853) while Pacific Bell may be responsible for the domain (408).

The search for someone at 408-555-5555 from the number 555-555-1234 might look something like:

1) Query the server for 555-555 for a match.
2) Since the number does not exist locally, Server(555-555), queries the server for 555 for a match
3) Since the match does not exist locally, Server(555) queries the "root server", i.e., Server( ). The root server knows about Server(408) and queries Server(408)
4) Server(408) queries Server(408-555)
5) Server(408-555) returns a match (ie Query(408-555-5555)→Response(http://hpage.cisco.com/luke)
6) Response may be sent back recursively or just to the initial requestor.

Referring back to FIG. 3A. system 300 further includes an originating phone 308. It is contemplated that a wide variety of VoIP devices may be utilized within the present invention. In a preferred embodiment, phone 308 may comprise a VoIP terminal configured to communicate over an IP network and view web pages. In an exemplary non-limiting embodiment of the present invention, phone 308 may comprise a VoIP terminal comprising hardware and software known in the art, such as a Cisco Softphone or Cisco 7960, both available from Cisco Systems, Inc. Phone 308 may also comprise an IP telephone as shown and described in FIG. 1. Phone 308 as shown and described provides an example of means for originating a request.

System 300 may further include an HTTP server 310. HTTP server 310 is configured to display connection options to phone 308. HTTP server 310 may comprise hardware and software standard in the art suitable for displaying information utilizing HTTP. HTTP server 310 may also comprise hardware and software as shown and described in FIG. 1. HTTP server 310 as shown and described provides an example of means for displaying connection options. HTTP server 310 may be incorporated, as a software component, in a default telephony device such as the callee's desk-phone.

It is contemplated that phone 308 may be operatively coupled with HTTP server 310 and protocol server 302 over an IP network as shown and described above.

One example of the operation of the present invention will now be shown and described.

User Makes Request

Figure 4:
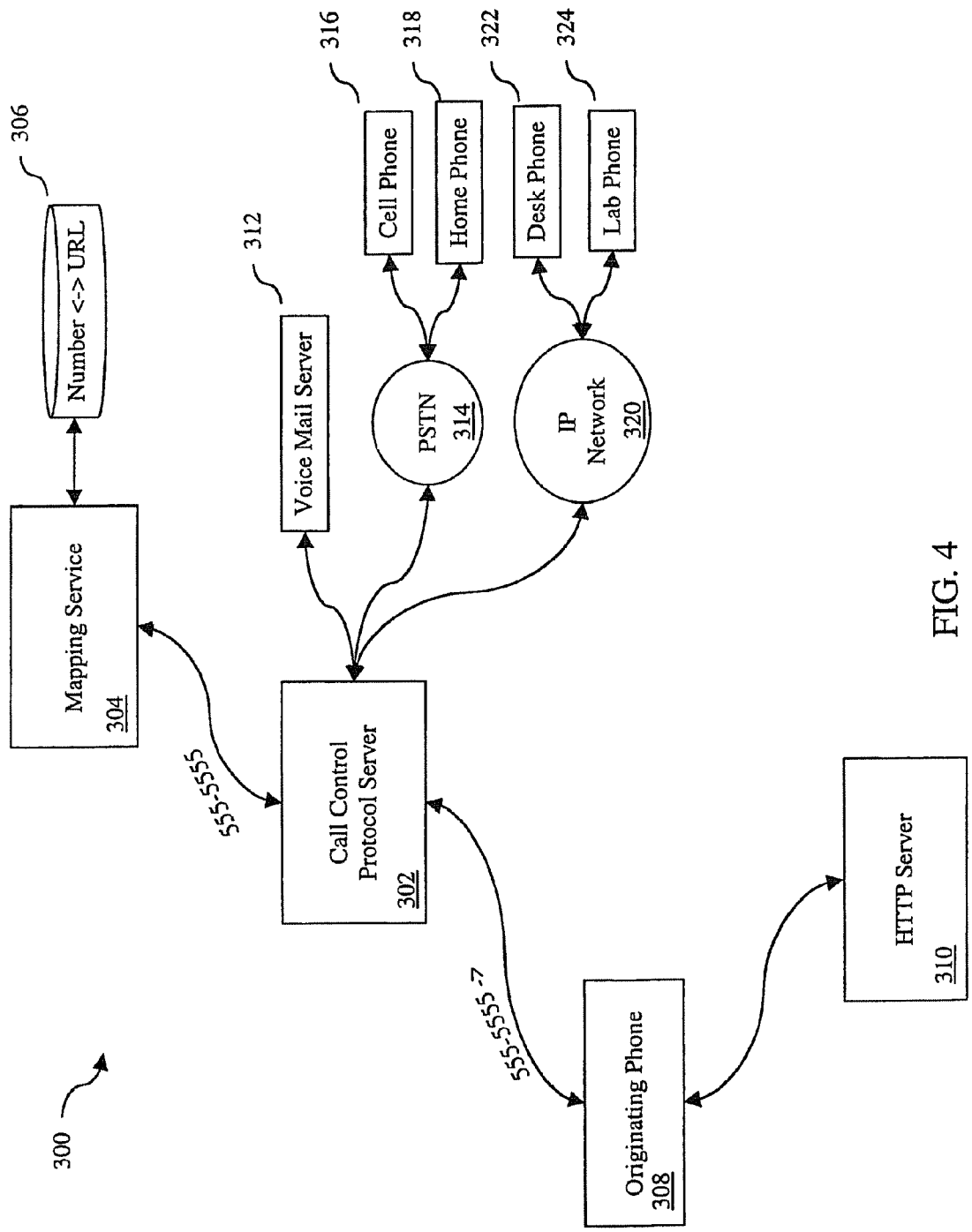
FIG. 4 is a functional block diagram of a VoIP system illustrating the act of a user making a request according to the present invention.

FIG. 4 is a functional block diagram of a VoIP system 300 illustrating the act of a user making a request according to the present invention.

For the purposes of the present example, we will assume that a caller wishes to contact an employee of Cisco Systems, Inc. named Al. The caller initially places the call from phone 308 by placing a request for information regarding a party to be called. The present invention accomplishes this task through the mapping of Al's URL. In the present example, the caller proceeds by entering Al's phone number 555-5555 into phone 308. As can be seen by inspection of FIG. 4, Al's number is then routed to mapping service 304 by protocol server 302.

Return of URL

Figure 5:
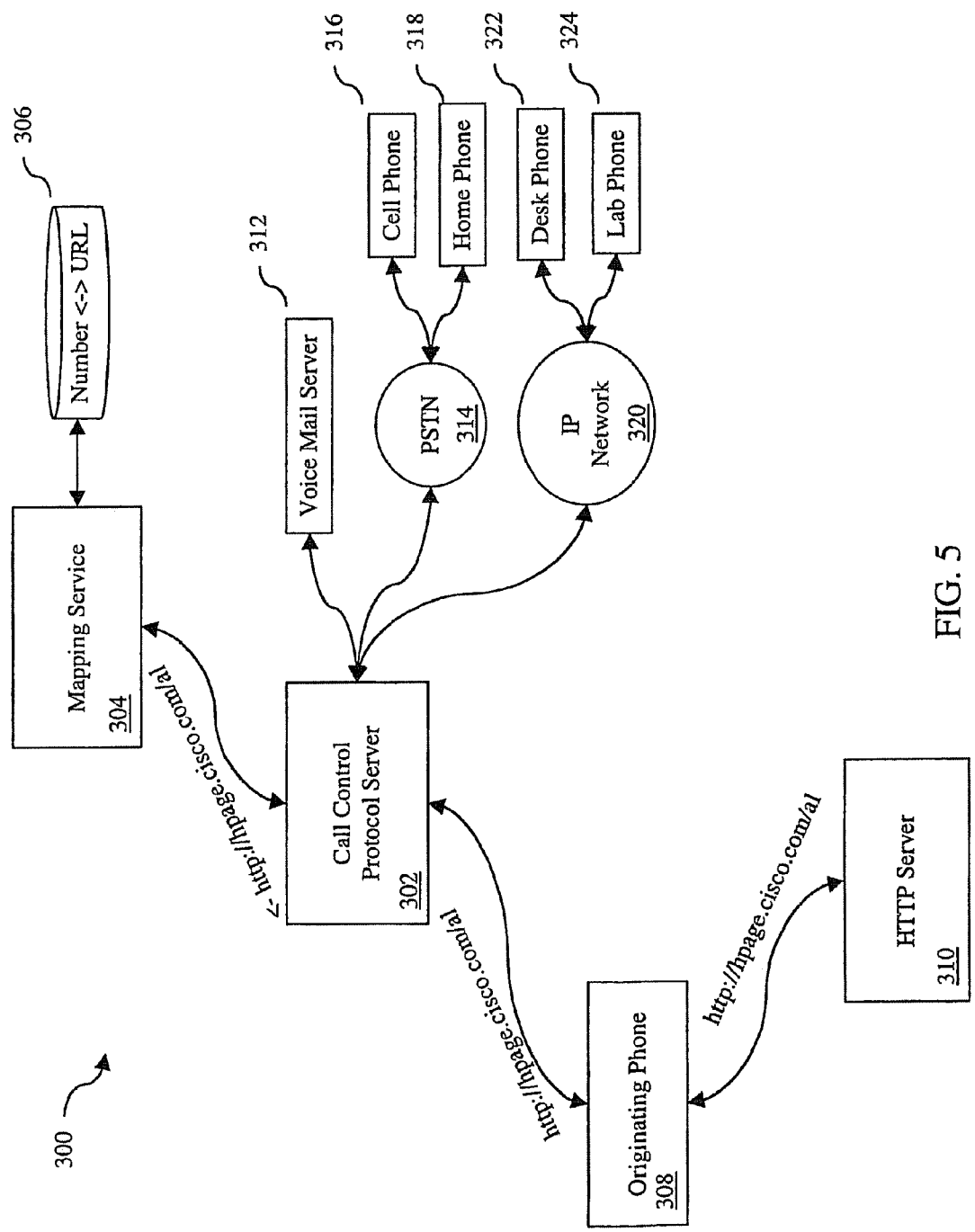
FIG. 5 is a functional block diagram of a VoIP system illustrating the act of a URL being returned to the caller.

FIG. 5 is a functional block diagram of a VoIP system 300 illustrating the act of a URL being returned to the caller.

After the mapping service 304 has received the request of FIG. 4, the mapping service 304 then maps Al's phone number 555-5555 to a URL. In this example, we will assume the URL http://hpage.cisco.com/al is returned by the mapping service 304. The URL is then provided to the protocol server 302, which in turn routes the URL back to the caller's phone 308. Having received a URL responsive to the caller's request, the caller may now access the URL through an HTTP server 310.

Information Gathering

Figure 6A:
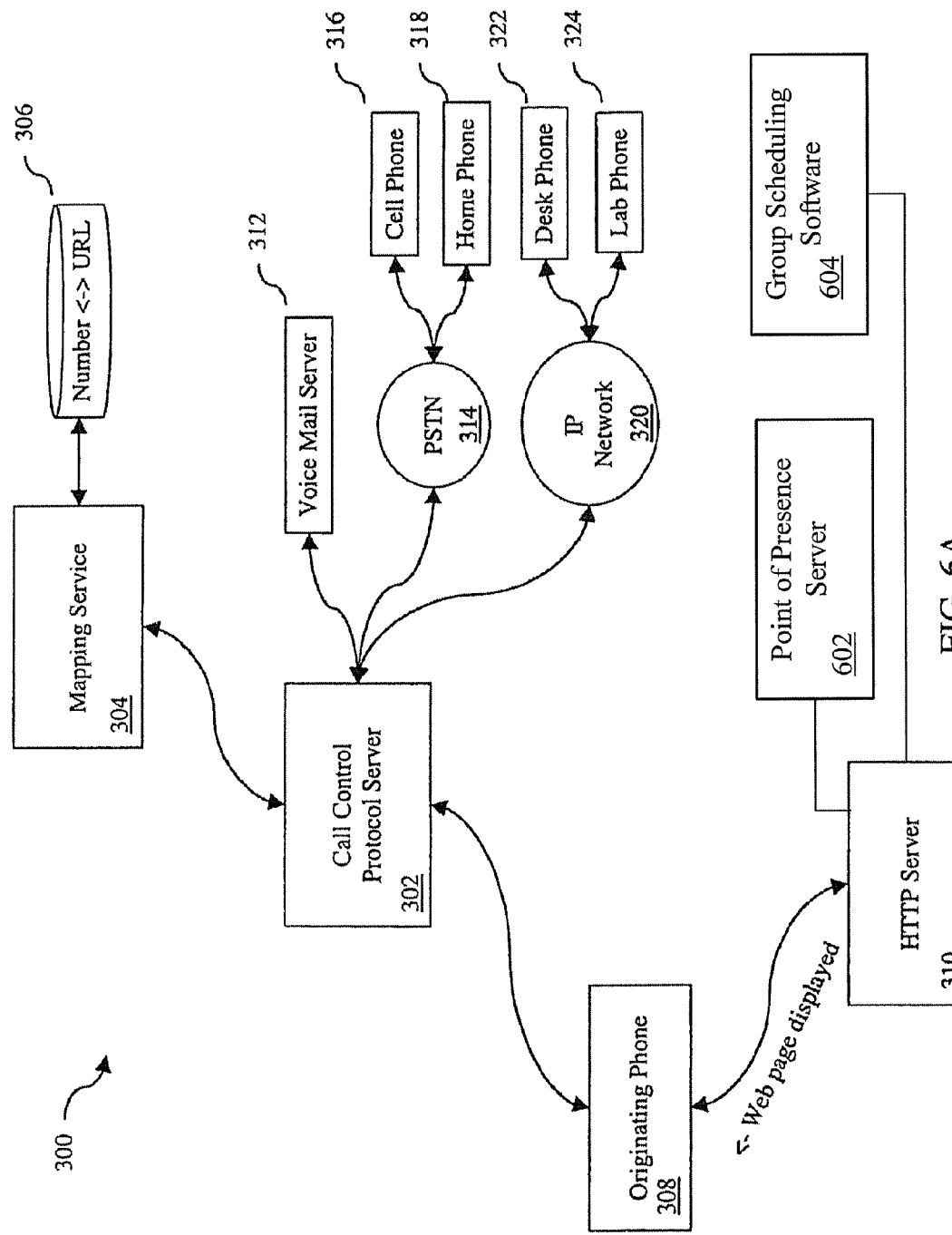
FIG. 6A is a functional block diagram of a VoIP system illustrating that act of providing connection options to a caller according to the present invention.

FIG. 6A is a functional block diagram of a VoIP system 300 illustrating that act of providing connection options to a caller according to the present invention.

After presenting the received URL to HTTP server 310, the caller is now in what the inventors refer to as a 'information gathering state'. In this state, the HTTP server 310 will present the caller's phone 308 with information regarding the connection options available according to the URL. Thus, the caller may be presented with information by viewing a web page which contains connection options displayed according to the URL.

Figure 6B:
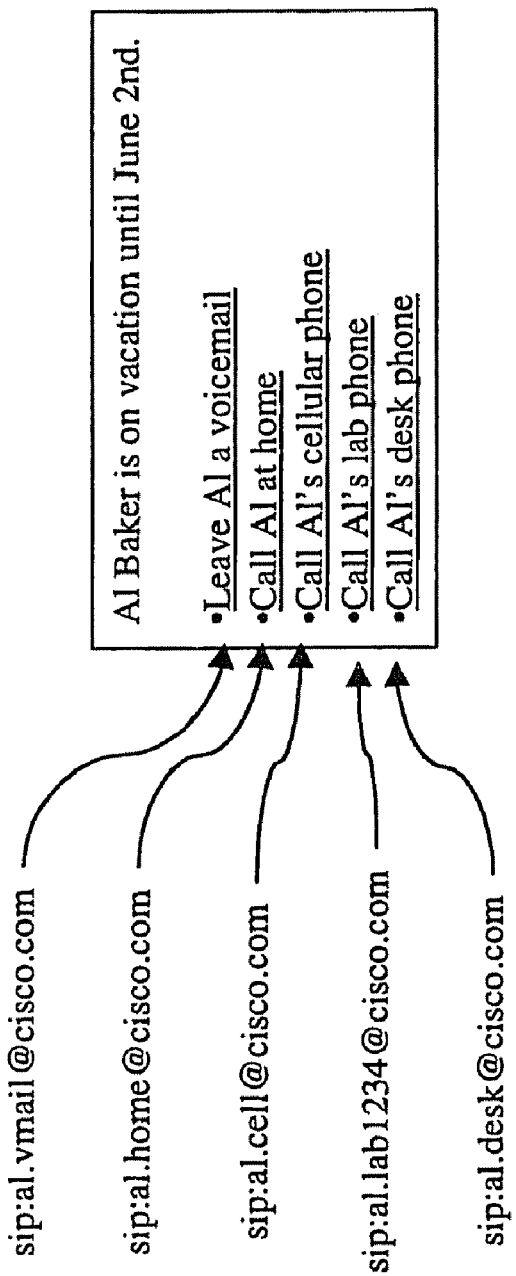
FIG. 6B is a web page according to the present invention showing an example of how connection options may be presented to a caller.

An example of such a web page is shown in FIG. 6B. As can be seen by inspection of FIG. 6B, connection options may be provided to a caller by associating a particular connection option with a corresponding link. FIG. 6B shows that each connection option may comprise a session request encoded according to SIP. As is known by those of ordinary skill in the art, SIP is a text-based protocol, similar to HTTP and SMTP, for initiating interactive communication sessions between users. Such sessions include voice, video, chat, interactive games, and virtual reality.

It is contemplated that the information gathering state may be made very flexible. For example, the web page of FIG. 6B may correspond to the particular number dialed by the caller's phone, rather than corresponding only to the called party's identity. Additionally, the connection options displayed may correspond to the called party's location. For example, if the caller attempts to call Al at home, the resulting URL may be different than the URL returned if the caller attempts to call Al at work. It is further contemplated that the user may be able to modify the web page using tools standard in the art to display only those connection options desired by the user. Thus, Al can modify the connection options presented to a caller based upon his location and/or the number dialed.

Additionally, the present invention may employ point of presence features 602, allowing a user such as Al to limit his availability throughout the work day by modifying his connection options according to his schedule. By communicating with the server (through the web or by phone), a user such as Al my have his connection options track his appointment schedule. It is also contemplated that group scheduling software 604 standard in the art may be used to modify the connection options throughout an enterprise.

Furthermore, in an enterprise/managed appliance situation, the called party's phone may also host the web page. If a server such as the Cisco 7960 is used which includes a httpd server, more options are available. For example, if the called party's phone also hosts the web page, a truly interactive interface may be accomplished. In this situation, the web page may now inform the called party that a call is pending, also allowing the calling party to message the called party through the use of specific links or fields provided on the web page. Thus, a caller may be able to display a message to the called party, such as: "This call is urgent, please pick up!".

Caller Makes a Choice

Figure 7:
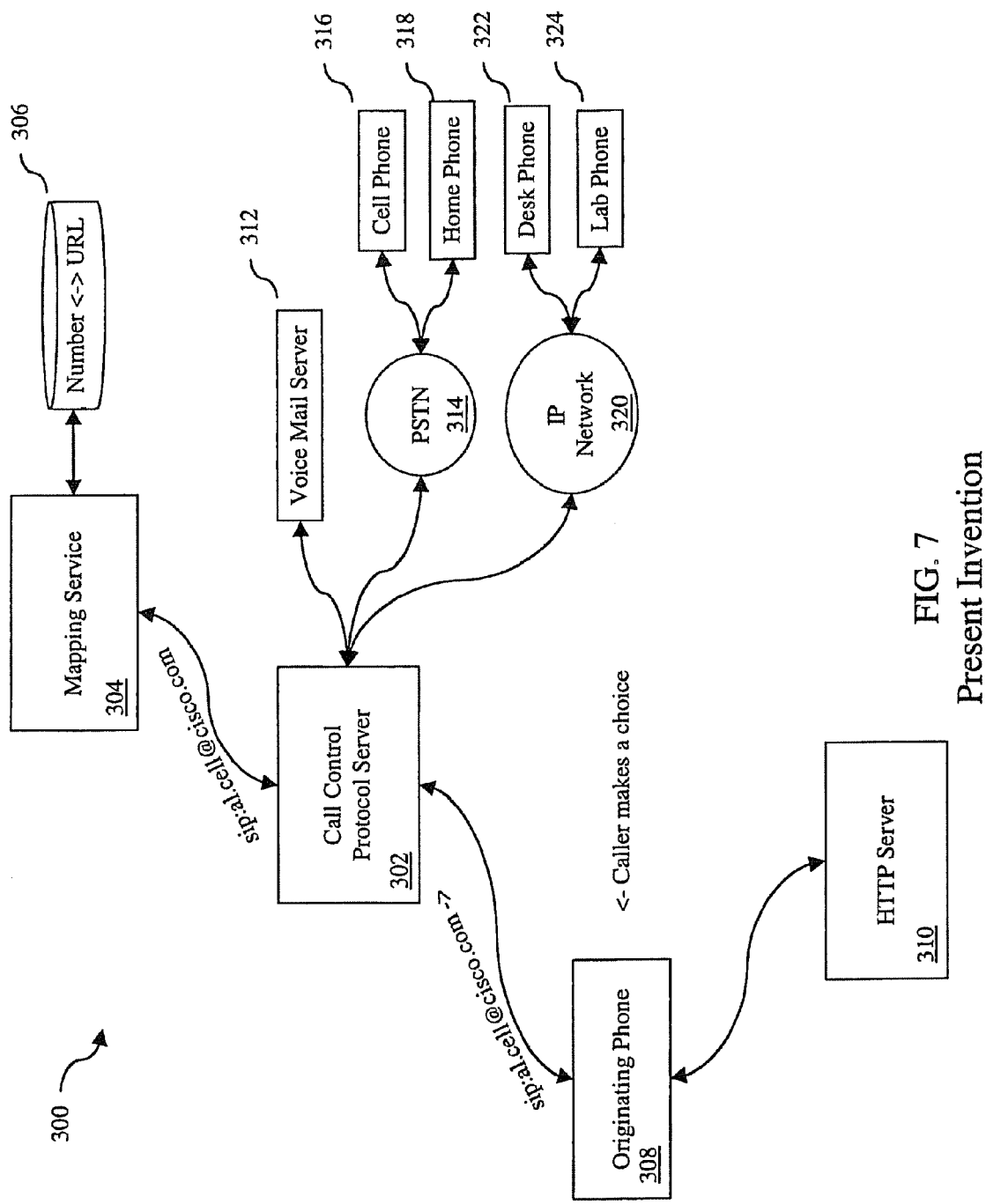
FIG. 7 is a functional block diagram of a VoIP system illustrating the act of a caller choosing a connection option according to the present invention.

FIG. 7 is a functional block diagram of a VoIP system 300 illustrating the act of a caller making of choice of a connection option according to the present invention.

After the user is presented with the available connection options, the user may choose a particular option. It should be noted that at this point on the process of the present invention, the caller has not actually attempted to make a phone call, the user has only gathered information regarding the connection options available for Al.

If there is a connection option satisfactory to the caller, the caller may then select the appropriate link. For this example, we will assume that the caller has chosen to call Al on his cell phone. In this case, the session request "sip: al.cell@cisco.com" will be routed to the mapping service 304 through the protocol server 302.

Selected Connection Option is Executed

Figure 8:
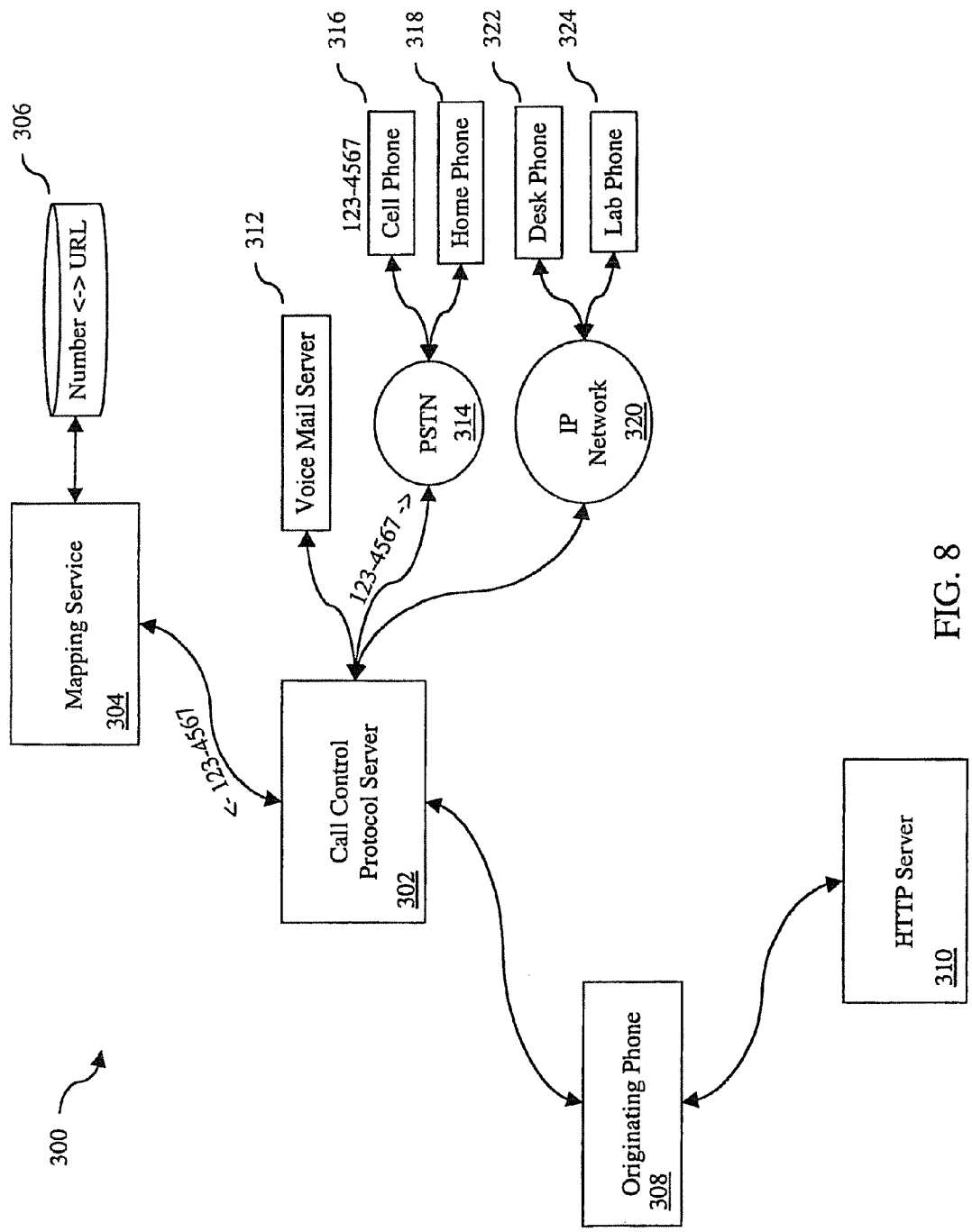
FIG. 8 is a functional block diagram of a VoIP system illustrating the act of executing a connection option according to the present invention.

FIG. 8 is a functional block diagram of a VoIP system 300 illustrating the act of executing a connection option according to the present invention.

After receiving the session request, the mapping server 304 will return the appropriate phone number to the protocol server. In this example, the mapping service has provided Al's cell phone number (123-4567) to the protocol server. Having received the appropriate phone number, the protocol server may now initiate the phone call by dialing Al's cell phone 316 through the PSTN 314.

As will be appreciated by those skilled in the art, the present invention provides many advantages. For example, by utilizing the calling interface of the present invention, a caller is able to make more intelligent decisions regarding how to reach others. Fruitless "phone tag" situations may be avoided where callers must wait for voicemail or call forwarding systems to activate.

Additionally, the present invention provides a user with great flexibility in how the user may present connection options to potential callers. The present invention allows users wide discretion in how sensitive numbers such as home numbers and cell phone numbers are displayed to potential callers.

By providing connection options to potential callers before the call is placed, the present invention may prevent unnecessary ringing of office and home phones.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method comprising:
   initiating a Voice over Internet Protocol call via a protocol server, wherein initiating the Voice over Internet Protocol call includes requesting information about a party to be called from a protocol server;
   receiving a Universal Resource Locator in response to the request for the information about the party to be called from the protocol server; and
   displaying to a caller one or more connection options in a first web page, wherein displaying the one or more connection options includes accessing the first web page at the Universal Resource Locator and using group scheduling software to determine an appointment schedule of the party to be called and modifying the one or more connection options based on the appointment schedule of the party to be called, wherein displaying the one or more connection options includes modifying the one or more connection options based on a location of the party to be called, wherein the location is determined by a presence server.

2. A device to provide an interface to a caller during initiation of a Voice over Internet Protocol call, the device comprising machine-readable media and a programmed processor, wherein the machine-readable media includes instructions executable with the programmed processor to:
   receive a first request for information about a party to be called, wherein the first request includes a user identifier to identify the party to be called;
   receive a Universal Resource Locator corresponding to the user identifier from a mapping service;
   return the Universal Resource Locator in response to the first request,
   determine a location of the party to be called based on a presence server;
   modify one or more connection options based on the location of the party to be called; and
   generate a web page, the web page including the one or more connection options;
   transmit the web page in response to a second request addressed to the Universal Resource Locator.

3. The device of claim 2, wherein the one or more connection options are encoded using Session Initiation Protocol.

4. The device of claim 2, wherein the one or more connection options are also modified based on an identity of the caller.

5. The device of claim 2, wherein the one or more connection options correspond to a phone number of the party to be called.

6. The device of claim 2, wherein the one or more connection options correspond to a schedule of the party to be called.

7. The device of claim 2, wherein said one or more connection options are modified by group scheduling software to correspond to a schedule of the party to be called.

8. A computer readable media encoded with computer executable instructions, wherein the computer executable instructions when executed are operable to:
   receive a first request including an identifier of a party to be called over Voice over Internet Protocol;
   request from a mapping service a Universal Resource Locator associated with the identifier of the party to be called;
   returning the Universal Resource Locator in response to the first request;
   receive a second request issued to the Universal Resource Locator;
   determine a location of the party to be called from a presence server;
   modify one or more connection options based on the location of the party to be called;
   generate a web page, wherein the web page includes the one or more connection options; and
   return the web page in response to the second request.

9. The computer readable media of claim 8, wherein the one or more connection options are encoded using Session Initiation Protocol.

10. The computer readable media of claim 8, wherein the one or more connection options are also modified based on an identity of the caller.

11. The computer readable media of claim 8, wherein the identifier of the party to be called includes phone number of the party to be called.

12. The computer readable media of claim 8, wherein the one or more connection options are also modified based on a location of the party to be called.

13. The computer readable media of claim 8, wherein the one or more connection options are also modified based on a schedule of the party to be called.

14. The computer readable media of claim 8, wherein the one or more connection options are modified by group scheduling software to correspond to a schedule of the party to be called.

* * * * *